United States Patent [19]

Yoon

[11] Patent Number: 5,703,662
[45] Date of Patent: Dec. 30, 1997

[54] TELEVISION FOR STORING AND DISPLAYING STILL PICTURE

[75] Inventor: Hyung-su Yoon, Seoul, Rep. of Korea

[73] Assignee: Samsung Electronics Co., Ltd., Kyungki-do, Rep. of Korea

[21] Appl. No.: 580,516

[22] Filed: Dec. 28, 1995

[30] Foreign Application Priority Data

Aug. 5, 1995 [KR] Rep. of Korea ............ 95-24249

[51] Int. Cl.[6] .......................................... H04N 5/44
[52] U.S. Cl. ..................... 348/728; 348/727; 348/731; 348/738; 348/706
[58] Field of Search ................... 348/725, 726, 348/727, 728, 731, 738, 705, 706, 567; H04N 5/44, 5/455, 5/50, 5/60, 5/445, 5/268

[56] References Cited

U.S. PATENT DOCUMENTS 5,311,317  5/1994  Ogura ............................ 348/725

*Primary Examiner*—Sherrie Hsia
*Attorney, Agent, or Firm*—Sughrue, Mion, Zinn, Macpeak & Seas, PLLC

[57] ABSTRACT

A television for storing and displaying a stored still picture, which includes: a memory for storing a still picture of a desired scene; a decoder for separating a video signal of a broadcast channel into an RGB signal and a synchronizing signal; a synchronizing signal detector for outputting a detection signal according to the existence of the synchronizing signal; a microcomputer for controlling so that the RGB signal output from the decoder can be displayed on a picture tube by recognizing the detection signal when a normal broadcast signal is input and so that the still picture stored in the memory can be displayed on the picture tube when a normal broadcast signal is not input. Thus, if a broadcast channel goes off the air, or a channel which is not on the air is selected, a selected picture is retrieved from the memory and displayed on the television screen, thereby reducing eye fatigue.

9 Claims, 3 Drawing Sheets

TELEVISION FOR STORING AND DISPLAYING STILL PICTURE

BACKGROUND OF THE INVENTION

The present invention relates to a television which stores and displays a still picture, and more particularly, to a television which stores a desired still picture in advance and displays the stored still picture when there is no signal.

As shown in FIG. 1, a conventional television includes: a tuner 1 for converting a radio frequency (RF) signal received through an antenna into a sound signal and a video signal of an intermediate frequency (IF); a demodulator 2 for demodulating sound and video signals from the IF audio and video signals, respectively; a comb filter 3 for separating the demodulated video signal into a luminance signal and a chrominance signal; a decoder 4 for separating an output of comb filter 3 into RGB signals, and a horizontal synchronizing signal (H) and a vertical synchronizing signal (V); a picture tube 5 for displaying the RGB signal output from decoder 4; a synchronizing signal detector 6 for detecting the horizontal and vertical synchronizing signals (H, V) output from decoder 4 to output the detecting signal responding to the horizontal and vertical synchronizing signals; a microcomputer 9 for outputting a mute control signal (CNT) according to the detecting signal from synchronizing signal detector 6; and a sound signal processor 8 for processing the sound signal output from demodulator 2 to output the processed sound signal through a speaker if a normal television broadcast signal is input through the antenna and for muting the sound signal according to the mute control signal output from microcomputer 7 when no signal is input through the antenna.

In the conventional television constructed as shown in FIG. 1, in case that a channel having no signal is selected or the transmission of a broadcast signal from a broadcast station is stopped, RF noise is displayed on the screen of picture tube 5. Then, a predetermined time (2–3 seconds) after the non-signal channel is selected or the broadest station ceases transmission of a broadcast signal, only the sound is muted. Such a conventional television causes the user to experience eye fatigue due to the RF noise on the screen.

Also, in another conventional television, when no signal is input (or when a non-signal channel is selected), a background screen is processed to have a blue-back screen. In this case, since a monotonous and bright blue screen is displayed, there is also a drawback in that the eyes of the user get fatigued.

SUMMARY OF THE INVENTION

It is an object of the present invention to provide a television having a function to select and store a still picture of a desired scene from the broadcast signal of a currently-selected channel or an externally-input picture signal.

It is another object of the present invention to provide a television for displaying the pre-stored still picture when a non-signal channel is selected or no signal is input.

To accomplish the above objects, there is provided a television according to the present invention including: a first input terminal for receiving a first video signal of a broadcast channel through an antenna; a second input terminal for receiving a second video signal reproduced by an external video recording/reproducing device; a switching means for selecting one of the video signals input through the first and second input terminals; a memory for storing the video signal selected by the switching means; and control means for outputting a selection control signal for selecting one of the video signals input through the first and second input terminals to the switching means by recognizing a key input of a user for storing a desired scene, and for outputting a control signal so that the signal selected by the switching means is written in the memory.

According to another aspect of the present invention, a television having a memory for storing a still picture signal corresponding to a desired scene includes: signal processing means for separating a video signal of a broadcast channel into RGB signals and a synchronizing signal; detecting means for outputting a detecting signal according to the existence of the synchronizing signal output from the signal processing means; and control means for controlling so that the RGB signals are displayed on a picture tube when a normal broadcast signal is input and the still picture stored in the memory is displayed on the picture tube when no signal is input, by recognizing the detecting signal.

A television according to yet another aspect of the present invention includes: a tuner for converting an RF signal of a broadcast channel input through an antenna into an IF sound signal and an IF video signal; demodulating means for demodulating a sound signal and a video signal from the IF sound signal and IF video signal, respectively; storage means for storing a still picture of a desired scene; detecting means for detecting a synchronizing signal from the demodulated video signal to output a detecting signal; and control means for controlling so that the video signal of the desired scene output from the demodulating means is stored in the storage means when a normal broadcast signal is input and the still picture stored in the storage means is displayed when no signal is input, by recognizing the detecting signal.

A television according to still yet another aspect of the present invention includes: a key input portion having at least one still picture storage key; a tuner for converting an RF signal of a broadcast channel received through an antenna into an IF video signal and an IF sound signal; a demodulator for demodulating a video signal and a sound signal from the IF video and sound signals, respectively; first signal processing means for separating said video signal into RGB signals and a synchronizing signal; detecting means for detecting said synchronizing signal output from said first signal processing means to output a detecting signal; control signal generating means for recognizing the detecting signal from the detecting means and a key input from said key input portion to output first to fourth control signals; second signal processing means for processing the sound signal output from said demodulator to be output as an audio signal when a normal broadcast signal is input and for muting said sound signal according to the first control signal when no signal is input; first switching means for switching the RGB signals output from the first signal processing means and RGB signals input from an external video recording/reproducing device according to said second control signal; a memory for writing in and reading out the RGB signals switched by the first switching means according to the third control signal; and second switching means for switching said RGB signals output from said first signal processing means and the RGB signals read out from said memory according to the fourth control signal, to display the switched signal on a picture tube.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Referring to the attached drawings, one embodiment of the present invention will be explained as follows.

Figure 1:
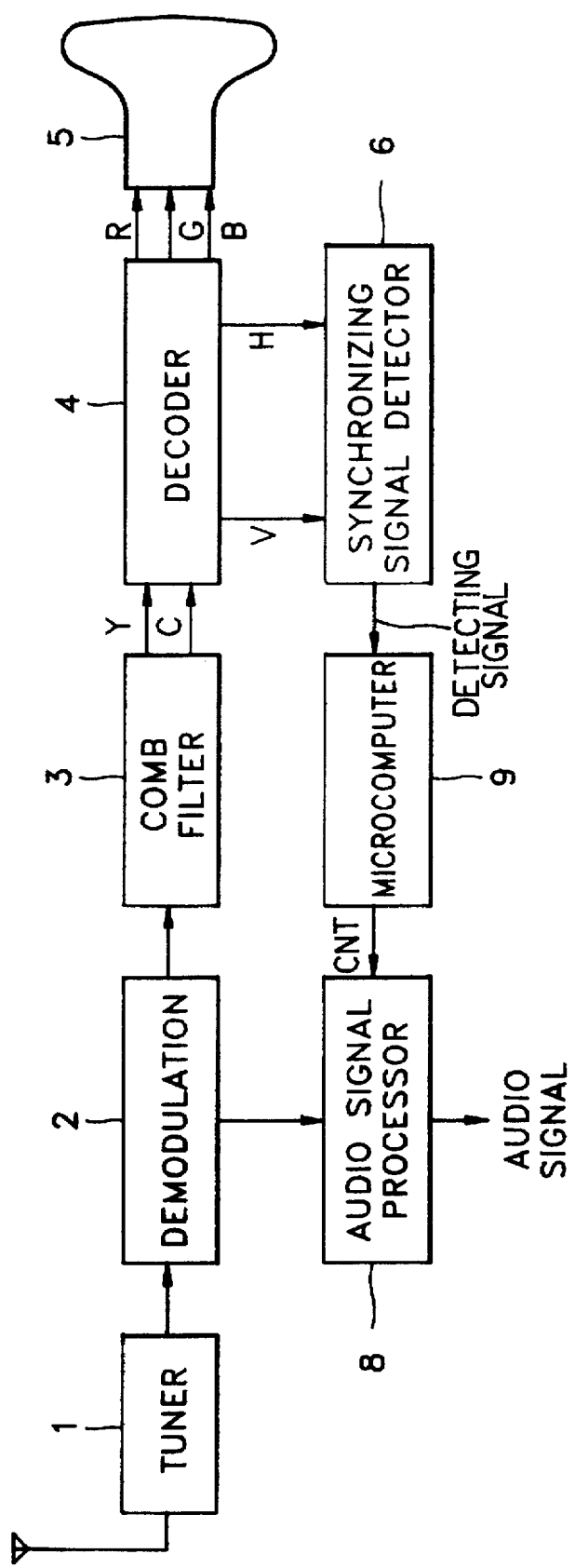
FIG. 1 is a block diagram of a conventional television.
Figure 2:
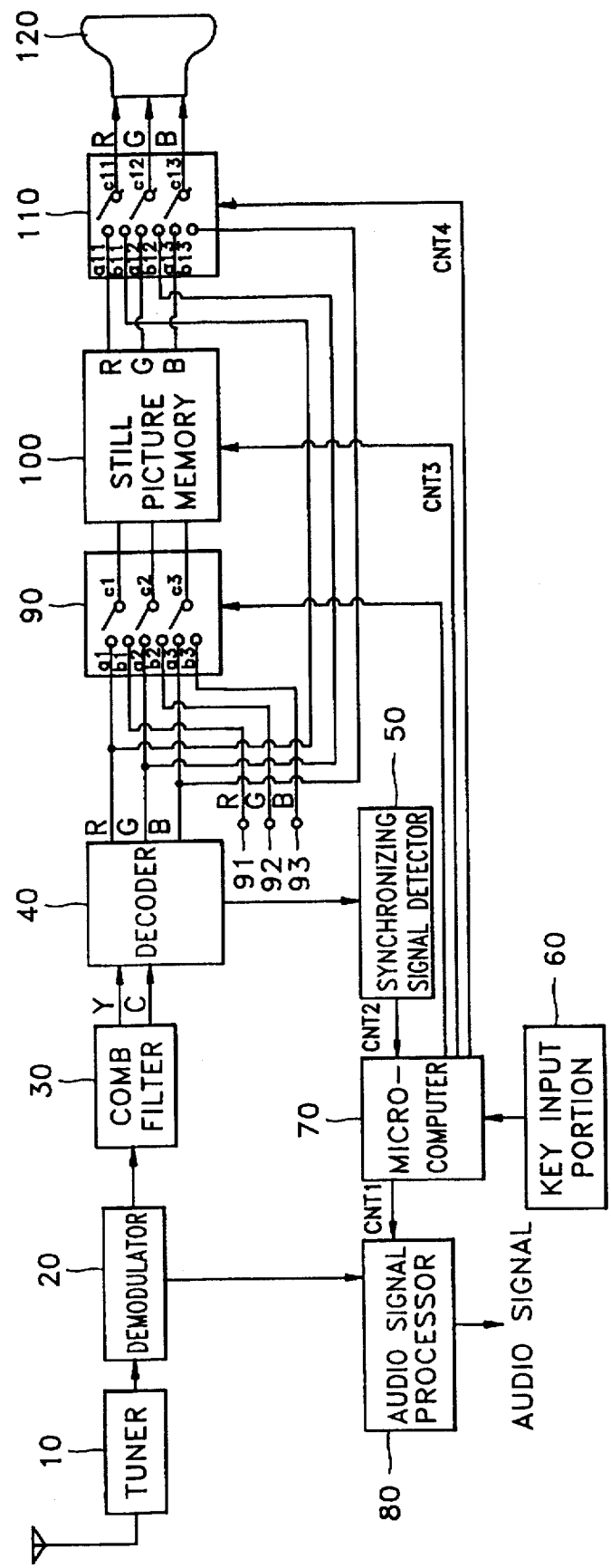
FIG. 2 is a block diagram showing one embodiment of a television for storing and displaying a still picture according to the present invention.

Referring to FIG. 2 which is a block diagram of a television for storing and displaying a still picture according to the present invention, the television includes: a tuner 10 for converting an RF signal received through an antenna into an IF signal; a demodulator 20 for demodulating the IF signal into a video signal and a sound signal; a comb filter 30 for separating the video signal into a luminance signal (Y) and a chrominance signal (C); a decoder 40 for separating an output of comb filter 20 into RGB signals and horizontal and vertical synchronizing signals (H, V); a synchronizing signal detector 50 for detecting the horizontal and vertical synchronizing signals (H, V) output from decoder 40 to thereby output a detecting signal in response to the detected horizontal signals and vertical synchronizing; a key input portion 60 having at least a storage mode key of the still picture; a microcomputer 70 for recognizing the detecting signal from synchronizing signal detector 50 and the key input from key input portion 60 to thereby output control signals (CNT1–CNT4); a sound signal processor 80 for processing the sound signal output from demodulator 20 to output the processed sound signal when a normal broadcast signal is input and for muting the sound signal according to the control signal (CNT1) when no signal is input, a first control switch 90 of which selection contacts (a1–a3) are connected to RGB output terminals of decoder 40, selection contacts (b1–b3) are connected to external input terminals (91–93) and a control contact is connected to the control signal (CNT2) output terminal of microcomputer 70; a still picture memory 100 for writing in and reading out the RGB signals input through first control switch 90 according to control signal (CNT3); and a second control switch 110 of which selection contacts (a11–a13) are connected to data output terminals of still picture memory 100, selection contacts (b11–b13) are connected to RGB output terminals of decoder 40, a control contact is connected to control signal (CNT4) output terminal of microcomputer 70 and fixed contacts (c11–c13) are connected to a picture tube 120.

Figure 3:
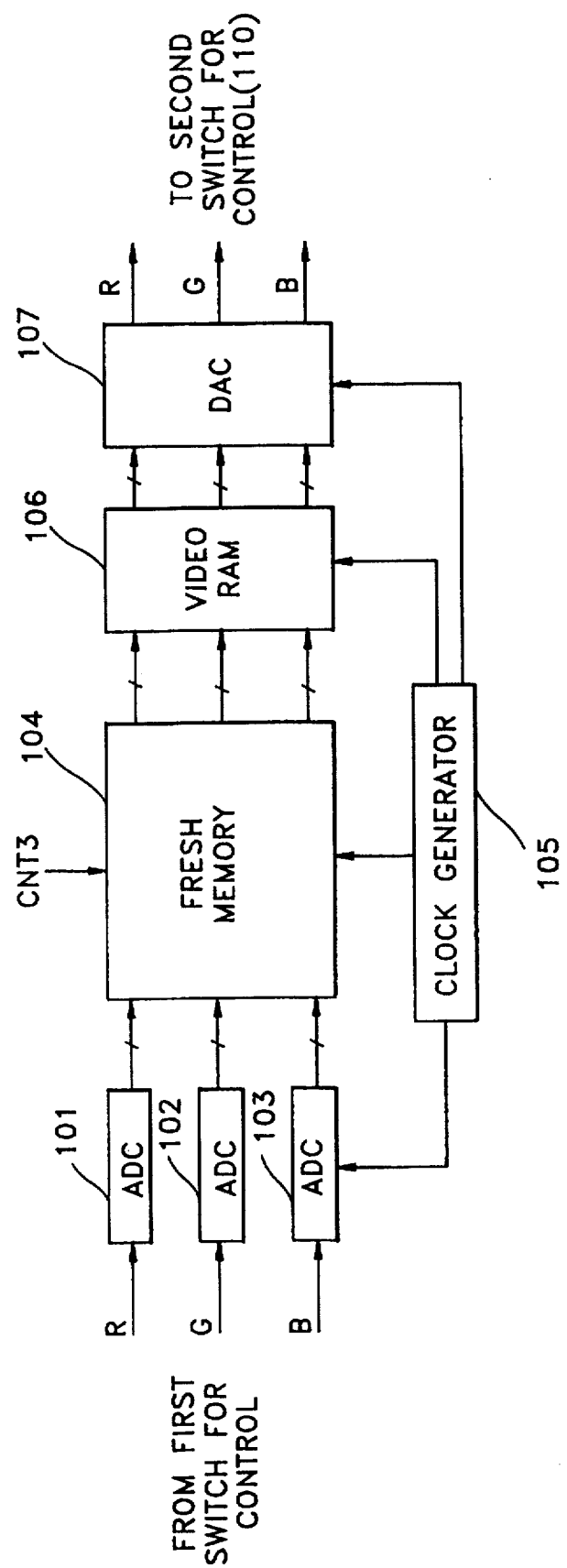
FIG. 3 is a detailed block diagram of a still picture memory shown in FIG. 2.

Still picture memory 100 constructed as shown in FIG. 3 includes: analog-digital converters (ADC) 101 to 103 for converting the analog RGB signals input through first control switch 90 into digital signals, respectively; a flash memory 104 for writing in and reading out the digital RGB signals according to the control signal (CNT3) of microcomputer 70; a video RAM 106 for temporarily storing the digital RGB data read out from flash memory 104; a digital-analog converter (DAC) 107 for converting the digital RGB signals read out from video RAM 106 into the analog RGB signals; and a clock generator 105 for providing driving clocks to ADC's 101 to 103, flash memory 104, video RAM 106 and DAC 107.

The operation of the television shown in FIG.2 will be explained in detail with reference to FIG. 3.

According to FIG. 2, tuner 10 converts the RF signal received through the antenna into the IF video signal and the IF sound signal. Demodulator 20 demodulates a video signal and a sound signal from the IF video signal and the IF sound signal output from tuner 10, respectively.

Comb filter 30 separates the demodulated video signal into the luminance signal (Y) and the chrominance signal(C) and decoder 40 matrix-processes the Y and C signals into the RGB signals and the horizontal and vertical synchronizing signals (H, V). Synchronizing signal detector 50 detects the existence of the horizontal and vertical synchronizing signals (H, V) output from decoder 40, and outputs a logic "high" detecting signal if the synchronizing signals do not exist and outputs a logic "low" detecting signal if the synchronizing signals exist.

Microcomputer 70 recognizes the logic state of the detecting signals and the key input of key input 20 portion 60 to thereby output control signals (CNT1–CNT4).

Namely, if the "low" detecting signal is input from synchronizing signal detector 50, microcomputer 70 recognizes that the signal of a normal broadcast channel is being input, and outputs the control signal (CNT2) to first control switch 90 and outputs the control signal (CNT4) to second control switch 110.

Namely, first control switch 90 is turned off according to control signal (CNT2) and second control switch 110 selects the RGB signals input through selection contacts (b11–b13) according to control signal (CNT4) from decoder 40 to display the selected signals on picture tube 120.

If the function of a still picture storage mode key is executed through key input portion 60 in order to store the video signal of the desired scene in memory 100 by temporarily stopping the screen which is on the air according to the signal of the normal broadcast channel, microcomputer 70 recognizes the key input to output control signal (CNT2) to first control switch 90, control signal (CNT3) to still picture memory 100 and control signal (CNT4) to second control switch 110.

First control switch 90 connects selection contacts (a1–a3) to fixed contacts (c1–c3) according to control signal (CNT2) to output the RGB signals of a desired scene among the signal of the present broadcast channel output from decoder 40 to still picture memory 100.

In order to store the RGB signals of a desired scene among the video signal reproduced from an external video recording/reproducing device such as a video cassette recorder or a camcorder in still picture memory 100, selection contacts (b1–b3) of first control switch 90 connected to external input terminals 91 to 93 for inputting the external RGB signals are selected according to control signal (CNT2) to thereby write the selected output in still picture memory 100.

Control signal (CNT2) output from microcomputer 70 is composed of 2 bits. For example, if "01" is output, selection contacts (a1–a3) of first control switch 90 are connected to fixed contacts (c1–c3), if "10" is output, selection contacts (b1–b3) are connected to fixed contacts (c1–c3) and if "00" is output, the off state is attained.

The RGB signals selected by first control switch 90 according to control signal (CNT2) is written in still picture memory 100. It is possible to store a plurality of still pictures in still picture memory 100. Control signal (CNT3) serves as a writing/reading control signal of memory 100.

According to control signal (CNT4), second control switch 110 selects selection contacts (a11–a13) to output the signal of the still picture stored in still picture memory 100 through decoder 40 to picture tube 120.

If the function of a storage termination key is executed through key input portion 60, first control switch 90 is turned off according to control signal (CNT2) to thereby terminate a storage process to still picture memory 100. The storage termination key may be a separate key installed on key input portion 60. After the function of the storage mode key is executed by using a still picture storage mode key to set the storage mode, the function of the storage mode key is executed again to terminate the storage.

Next, if a non-signal channel is selected or no signal is input, the RGB signals and the horizontal and vertical synchronizing signals (H, V) are not output from decoder 40 so that synchronizing signal detector 50 outputs the "high" detecting signal to microcomputer 70.

Microcomputer 70 recognizes the "high" detecting signal and outputs control signals (CNT1–CNT4) to audio signal processor 80, first and second control switches 90 and 110, and still picture memory 100. Audio signal processor 80 mutes the sound signal according to control signal (CNT1) and first control switch 90 is controlled to be turned off according to control signal (CNT2) so that the data are not written in still picture memory 100.

Still picture memory 100 is set to a reading-out mode according to control signal (CNT3) to output the RGB data of the desired scene stored in still picture memory 100 to second control switch 110.

Selection contacts (a11–a13) of second control switch 110 are connected to fixed contacts (c11–c13) according to control signal (CNT4) to output the RGB data read out from still picture memory 100 to picture tube 120. Accordingly, if the non-signal channel is selected or no signal is input, the sound signal is muted and the pre-stored still picture is displayed.

FIG. 3 is a detailed block diagram of still picture memory 100 shown in FIG. 2. Referring to FIG. 3, the analog RGB signals selected by first control switch 90 shown in FIG. 2 are converted into 8 bit digital signals respectively in ADC's 101 to 103, and the converted digital signals are stored in corresponding addresses of flash memory 104 according to control signal (CNT3) of microcomputer 70.

When the non-signal channel is selected or no signal is input, the data written in flash memory 104 are read out according to control signal (CNT3) supplied from microcomputer 70 to be stored in video RAM 106 for a short while. The flash memory is capable of conserving the still picture data without any alteration even when the power is off and storing a plurality of video signals of desired scenes.

The data stored in flash memory 104 are read out and stored in video RAM 106 for a short while, with a fast operation speed so that it is possible to real-time-process the stored data, considering that since an operation speed of flash memory 104 is slow, real-time processing is difficult.

Microcomputer 70 continuously reads out the data stored in flash memory 104 when the broadcast channel is changed or until a signal of a broadcast channel is input. At this time, the RGB data of one scene corresponding to the data stored in flash memory 104 can be read out continuously or the RGB data of a plurality of stored screens can be read out sequentially.

The data read out from flash memory 104 through video RAM 106 are converted into analog RGB signals in DAC 107 of 3 channels and output through second control switch 110 shown in FIG. 2. Clock generator 105 supplies the driving clocks to ADC's 101 to 103, flash memory 104, video RAM 106 and DAC 107.

As described above, according to the present invention, there is an advantage that after the desired scene of the screen of the channel which is on the air or the video signal input from outside is selected to be stored in the memory, the stored still picture is displayed when no signal is input so that the user does not suffer eye fatigue.

What is claimed is:

1. A television having a memory for storing a still picture signal corresponding to a desired scene comprising:

signal processing means for separating a video signal of a broadcast channel into RGB signals and a synchronizing signal;

detecting means for outputting a detecting signal according to the existence of said synchronizing signal output from said signal processing means; and control means for controlling so that said RGB signals are displayed on a picture tube when a normal broadcast signal is input and a still picture stored in said memory is displayed on the picture tube when no signal is input, by recognizing the detecting signal.

2. A television according to claim 1, wherein said television further comprises a sound signal processing means for processing a sound signal of the broadcast channel to be output as an audio signal when the normal broadcast signal is input and for muting said sound signal when the normal broadcast signal is not input.

3. A television comprising:

a tuner for converting an RF signal of a broadcast channel input through an antenna into an IF sound signal and an IF video signal;

demodulating means for demodulating a sound signal from said IF sound signal and a video signal from said IF video signal;

storage means for storing a still picture of a desired scene;

detecting means for detecting a synchronizing signal from the demodulated video signal to output a detecting signal; and control means for controlling so that the video signal of the desired scene is stored in the storage means when a normal broadcast signal is input, input of the normal broadcast signal being recognized when said detecting means detects the synchronizing signal, and the still picture stored in the storage means is displayed when the normal broadcast signal is not input.

4. A television according to claim 3, wherein said television further comprises sound signal processing means for processing the demodulated sound signal to be output as an audio signal when the normal broadcast signal is input and for muting said sound signal when the normal broadcast signal is not input.

5. A television according to claim 3, wherein said television further comprises:

an external input terminal for receiving a video signal reproduced by an external picture recording/reproducing device; and first switching means for selecting one of said demodulated video signal and said video signal input through said external input terminal under the control of said control means to output a selected signal to said storage means.

6. A television according to claim 5, wherein said television further comprises second selection means for selecting said demodulated video signal when the normal broadcast signal is input and selecting the still picture stored in said storage means when the normal broadcast signal is not input, and outputting a selected signal to said picture tube under the control of said control means.

7. A television according to claim 6, wherein said storage means comprises:
- an analog-digital converter for converting a signal switched by said first switching means into a digital signal;
- a flash memory for storing the digital signal of more than one screen under the control of said control means;
- a video RAM for storing a portion of said digital signal which corresponds to one screen received from said flash memory;
- a digital-analog converter for converting data read out from said video RAM into an analog signal; and
- a clock generator for supplying driving clocks to said analog-digital converter, said flash memory, said video RAM, and said digital-analog converter.

8. A television comprising:
- a key input portion having at least one still picture storage key;
- a tuner for converting an RF signal of a broadcast channel received through an antenna into an IF video signal and an IF sound signal;
- a demodulator for demodulating a video signal and a sound signal from said IF video signal and said IF sound signal, respectively;
- first signal processing means for separating said demodulated video signal into RGB signals and a synchronizing signal;
- detecting means for detecting said synchronizing signal output from said first signal processing means to output a detecting signal;
- control signal generating means for recognizing said detecting signal from said detecting means and a key input from said key input portion to output first to fourth control signals;
- second signal processing means for processing said sound signal output from said demodulator to be output as an audio signal when a normal broadcast signal is input, input of the normal broadcast signal being recognized when said detecting means detects the synchronizing signal, and for muting said sound signal according to said first control signal when the normal broadcast signal is not input;
- first switching means for selecting either said RGB signals output from said first signal processing means or RGB signals input from an external video recording/reproducing device according to said second control signal;
- storage means for writing in and reading out the RGB signals selected by said first switching means according to said third control signal; and
- second switching means for selecting either the RGB signals output from said first signal processing means or the RGB signals read out from said memory according to the fourth control signal, to display a switched signal on a picture tube.

9. A television according to claim 8, wherein said storage means comprises:
- an analog-digital converter for converting a signal switched by said first switching means into a digital signal;
- a flash memory for storing the digital signal of more than one screen under control of said control signal generating means;
- a video RAM for storing a portion of the digital signal output from said flash memory which corresponds to one screen;
- a digital-analog converter for reading out data from said video RAM and converting the data read out from said video RAM into an analog signal; and
- a clock generator for supplying driving clocks to said analog-digital converter, said flash memory, said video RAM, and said digital-analog converter.

* * * * *